Jan. 12, 1971      P. MACALUSO      3,554,826

METHOD OF BONDING FIBERS

Filed Sept. 13, 1967

INVENTOR
PAT MACALUSO
BY *Robert C. Sullivan*
ATTORNEY

United States Patent Office 3,554,826
Patented Jan. 12, 1971

3,554,826
METHOD OF BONDING FIBERS
Pat Macaluso, White Plains, N.Y., assignor to Stauffer Chemical Company, New York, N.Y., a corporation of Delaware
Filed Sept. 13, 1967, Ser. No. 667,424
Int. Cl. B29c 25/00
U.S. Cl. 156—82    11 Claims

ABSTRACT OF THE DISCLOSURE

Fibers such as in non-woven scrim are bonded together at selected contact points by direct flame exposure of the fibers with or without bonding aids. The fibers are preferably multifilament glass fibers, although they may be organic thermoplastics, such as nylon or polypropylene.

BACKGROUND OF THE INVENTION

Present methods of bonding fibers such as in non-woven scrim construction include the use of adhesives as the bonding agents. These methods require costly and time-consuming steps of drying, setting, curing or heat processing. While attempts have been made to replace these methods with methods which accomplish bonding by the application of high temperatures, these methods are applied to indiscriminately tangled or matted webs of fibers so that the advantages of scrim with directional fibers of controlled pliability are lost.

An object of this invention is to provide a method of bonding fiber, which is less costly and less time consuming than conventional methods.

A further object is to provide such a method which maintains the quality of the resulting scrim construction by controlling the contact points which will be fused, and the quality of bonding at these points.

SUMMARY OF THE INVENTION

In accordance with this invention the fibers are bonded together at their contact points by direct flame exposure. The use of a flame is particularly advantageous because it permits a concentrated application of heat. As a result it is possible to select which contact points will be fused or bonded to control the pliability of the scrim construction. Although a flame is preferred as the source of heat, hot gas application may also be used as long as the heat application can be concentrated to a sufficient enough extent so that there is control over which contact points wlil be fused.

This method is particularly suitable for forming inorganic, completely flame proof non-woven glass fiber scrim. Other materials may, however, be used such as nylon or polyproplyene. Additionally various binders and fluxes may be added to modify the action.

DETAILED DESCRIPTION

Figure 1:
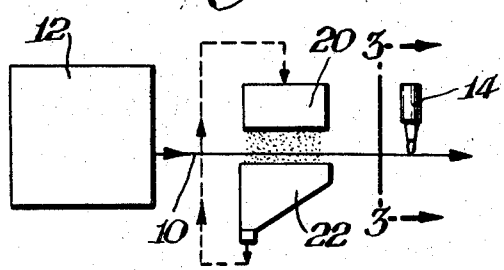
FIG. 1 is a schematic view illustrating a method in accordance with this invention.

FIG. 1 schematically illustrates a method of forming an inorganic, completely flame proof non-woven glass fiber scrim. As indicated therein glass fibers 10 are supplied from, for example, a non-woven fiber scrim machine 12 and ultimately pass under torches 14. The glass fibers 10 pass under torches 14 at a speed, for example, of 150 to 300 ft. per min. As later explained, torches 14 are controlled so that only selected contact points 18 remain unfused. The amount of fusing at the contact points determines the bonding strength and also controls the pliability of the scrim. If desired, all of the contact points can be fused. Where more pliability is desired, a proportionately larger number of contact points are skipped or unfused. The selective node fusing is especially desirable with high yarn count scrim.

The flame from a torch 14 may be applied directly to fibers 10, with the fibers in the same condition they are in when they leave the scrim machine 12. For added control of the resultant bonded scrim, a bonding aid, namely an adhesive or flux may be applied to the fibers before they are exposed to the flames from torches 14 or to the gas from a suitable hot gas applicator. Advantageous adhesives or binders or fluxes for this process include inorganic binders, fluxes and low flammability binders such as sodium silicate, potassium silicate, or borax fluxes. Organic binders as described below may also be used. These materials may be applied in powder or even aqueous solution form by any convenient means such as dusting, spraying, or dipping prior to passage through the flame area. The binder flows and concentrates under the contact points due to capillary action, if the fusion rate-viscosity values are properly adjusted relative to flame intensity and residence time.

The system is particularly advantageous in its speed and simplicity coupled with the ultimate in flame and smoke retardance. Since volatile solvents are avoided in favor of powder application or aqueous solution when a binder is used, the binder can be supplied by, for example, applicator 20 (as shown in FIG. 1) and recycled from recirculator 22 back to applicator 20, to thereby minimize cost. Aqueous solutions can be applied by simple dip or roller coating methods.

Figure 4:
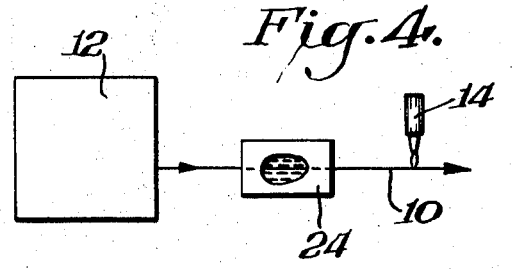
FIGS. 4-5 are schematic views of modified methods in accordance with this invention.
Figure 2:
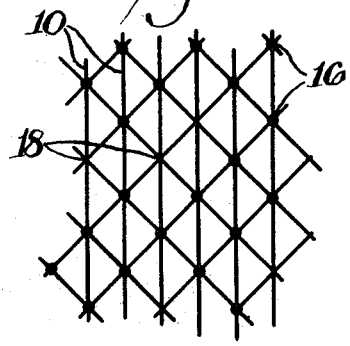
FIG. 2 is a schematic view of the bonded fibers resulting from the method of FIG. 1.

FIG. 4 shows an alternative arrangement where fibers 10 are dipped in binder tank 24 before passing through the flame area.

Figure 5:
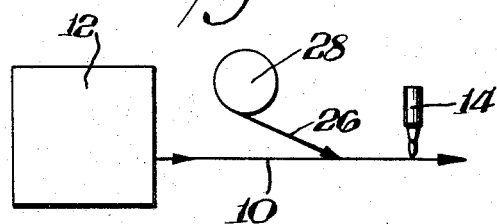

A further variation is to apply thermosetting material over, for example, the glass fibers in the warp. These thermosetting materials serve as binders with the excess available for subsequent lamination. FIG. 5 illustrates a convenient mode of effectuating this variation. As indicated there in the binder threads 26 from extruder 28 are extruded over scrim 10 prior to flaming.

Organic and semi-organic bonding aids such as silicone polymers, neoprene, chlorinated rubber, PVC, or low flammability thermo-sets such as urea-formaldehyde and phenol-formaldehyde resins can also be applied in any suitable manner, and flamed in order to achieve bonding with desired pliability or hand. The partial decomposition is not only tolerable, but sometimes is even sought with some binders if hand is maintained, and flammability as well as smoke development is decreased as a result of partial decomposition.

While other flash heating systems can be used, direct flaming is particularly desirable due to its simplicity and efficiency to thereby represent a minimum investment. A major advantage is the lower cost from higher through-put, since present drying limitations allow only a fraction of maximum machine speed.

Figure 3:
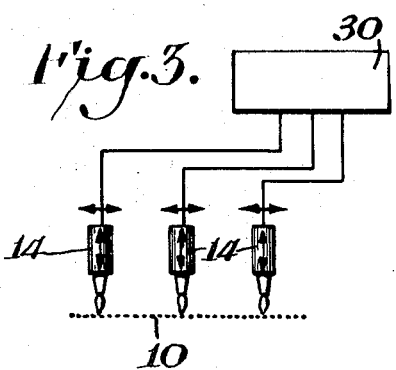
FIG. 3 is a sectional view taken through FIG. 1 along the line 3—3.

As previously indicated the stiffness or hand can be controlled by bonding only some nodes or fiber contact points. FIG. 3 illustrates a number of possible ways of accomplishing this selective bonding. For example the system may include a plurality of spaced flames from torches 14 which either oscillate laterally or oscillate normally to the scrim flow. There may also be a combination of the two types of oscillation. The selective binding may be accomplished by oscillating the torches 14 on and off. If desired these movements and controls may be programmed or otherwise manipulated from remote control panel 30. Further latitude or control may be had in the flame temperature. For example the flame or gas temperature can be adjusted by dilution with an inert gas. Additional controls may be had by adjusting the scrim linear passage rate as well as in the binder application.

The process of this invention is particularly suitable with fiber glass made of multifilament threads which gives stronger and more pliable fibers with faster through-put and less material requirements, thus being both more effective and more economical. Additionally the fiber glass of this invention is more flame-retardant and solvent resistant.

It is also possible to effectively apply the process of this invention to other fibers used in non-oven scrim fabrics such as organic thermoplastics without binders. Nylon and polypropylene are examples of organic thermoplastics which are particularly suitable with this invention.

With glass fibers the direct flame application of this invention results in the materials being highly flame-resistant whether the binders are merely lightly heated or are heated until charred.

EXAMPLE I

A glass fiber scrim was formed by flame bonding as follows: A non-woven scrim was threaded on a frame by laying 6 x 6 threads per inch in the two diagonal directions and 8 threads per inch in the forward direction. Pittsburgh Plate Glass Co. miltifilament glass thread #52 having a thread diameter of 0.120 mm. and a filament diameter of 10 microns was used. A thin dip coating of Borden Co. resorcinol-formaldehyde resin SL–412–17 containing 10% of Borden catalyst RB–9 was applied. The non-woven scrim was immediately passed over a propane gas flame from a wide ribbon burner at a linear velocity which permitted a residence time of about 0.1 second. The resulting bonded scrim was pliable and could be immersed for 10 minutes in water, acetone, hexane, toluene or methanol without noticeable softening or weakening.

Flame bonding conditions were varied to range from simple curing of the binder up to complete charring to the smoke-free point. In all cases the scrim was able to withstand ordinary handling and solvent immersion without loss of bonding.

EXAMPLE II

A non-woven scrim was formed with a 6 x 6 x 8 count as above, using nylon multifilament thread, namely Du Pont Merge No. 18723, with thread diameter of 0.25 mm. and filament diameter of 20 microns. Extensive bonding was obtained by direct fusion of filaments at or near thread contact points under the same flame conditions as above but with a residence time of about 0.004 seconds. The binder-free scrim was quite pliable and was able to be handle easily without rupture of bonds.

EXAMPLE III

A scrim was formed as in Example II, using a polypropylene multifilament thread, namely Hercules Co. Herculon Merge No. 465 with thread diameter of 0.45 mm. and filament diameter of 30 microns. Results similar to Example II were obtained with a flame residence time of about 0.002 seconds.

The residence times indicated in these examples are merely illustartive. Additionally temperatures, gas velocities and exposure distances can be varied by well known means to accomplish the desired rate and degree of bonding, without departing from the spirit of this invention.

Obviously many modifications and variations of this invention are possible in light of the above teachings.

What is claimed is:

1. A method of bonding unwoven fibers which are not in the form of fabrics to form flame-resistant non-woven scrim including the steps of feeding said unwoven fibers so that they intersect and form a single layer having a plurality of contact points, and thereafter heating selected contact points from among said plurality of contact points, the number of contact points that are heated in this manner being always less than all of said plurality of contact points, and simultaneously bonding the fibers together at the thus heated contact points, said fibers remaining structurally intact throughout said bonding process.

2. A method as set forth in claim 1 wherein the bonding is achieved by the heating and resultant direct fusion of the thus heated fibers.

3. A method as set forth in claim 1 wherein the bonding is achieved by the heating and resultant curing of binders which have been applied at the selected contact points prior to the heating thereof.

4. A method as set forth in claim 1 wherein the bonding is achieved by the heating and resultant fusion of binders which have been applied at the selected contact points prior to the heating thereof.

5. A method as set forth in claim 1 wherein heating is accomplished by applying flames against the selected contact points.

6. A method as set forth in claim 5 wherein non-volatile binders are applied to the fibers before the fibers are passed into the flame area.

7. A method as set forth in claim 6 wherein excess binder material is recycled for reuse.

8. A method as set forth in claim 6 wherein the fibers are glass fibers and the binder material is a thermosetting material which is applied to the glass fibers before the fibers are passed into the flame area.

9. A method as set forth in claim 5 wherein the fibers are organic thermoplastic multifilament fibers.

10. A method as set forth in claim 5 wherein the fibers are multifilament nylon threads.

11. A method as set forth in claim 5 wherein the fibers are multifilament polypropylene threads.

References Cited

UNITED STATES PATENTS

| | | | |
|---|---|---|---|
| 3,075,868 | 1/1963 | Long | 264—80X |
| 3,085,292 | 4/1963 | Kindseth | 264—80X |
| 3,275,489 | 9/1966 | Talv | 156—181 |
| 3,314,841 | 4/1967 | Romanin | 156—181X |
| 3,322,584 | 5/1967 | Welin-Berger | 156—82 |
| 3,324,609 | 6/1967 | Stein et al. | 156—82UX |
| 3,318,746 | 5/1967 | Langlois | 156—181X |
| 3,360,410 | 12/1967 | Romanin | 156—181X |
| 3,369,948 | 2/1968 | Ostmann, Jr. | 156—296X |
| 3,384,521 | 5/1968 | Borup | 156—181X |
| 3,444,025 | 5/1969 | Hillas | 264—174 X |

CARL D. QUARFORTH, Primary Examiner

H. E. BEHREND, Assistant Examiner

U.S. Cl. X.R.

156—94, 181